(12) United States Patent
Kim et al.

(10) Patent No.: US 9,787,450 B2
(45) Date of Patent: Oct. 10, 2017

(54) METHOD AND APPARATUS FOR ESTIMATING CHANNEL IN WIRELESS COMMUNICATION SYSTEM

(71) Applicant: LG ELECTRONICS INC., Seoul (KR)

(72) Inventors: Hyungtae Kim, Anyang-si (KR); Kijun Kim, Anyang-si (KR); Jonghyun Park, Anyang-si (KR); Hanbyul Seo, Anyang-si (KR); Bonghoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 341 days.

(21) Appl. No.: 14/383,216

(22) PCT Filed: Aug. 28, 2013

(86) PCT No.: PCT/KR2013/007721
§ 371 (c)(1),
(2) Date: Sep. 5, 2014

(87) PCT Pub. No.: WO2014/035137
PCT Pub. Date: Mar. 6, 2014

(65) Prior Publication Data
US 2015/0078271 A1 Mar. 19, 2015

Related U.S. Application Data

(60) Provisional application No. 61/751,238, filed on Jan. 10, 2013, provisional application No. 61/752,407, (Continued)

(51) Int. Cl.
*H04W 24/10* (2009.01)
*H04B 7/04* (2017.01)
(Continued)

(52) U.S. Cl.
CPC ......... *H04L 5/0051* (2013.01); *H04B 7/0417* (2013.01); *H04L 5/005* (2013.01);
(Continued)

(58) Field of Classification Search
CPC ... H04L 5/0048; H04L 5/0023; H04L 5/0053; H04L 5/0092; H04W 72/082
See application file for complete search history.

(56) References Cited

U.S. PATENT DOCUMENTS

2011/0170498 A1* 7/2011 Liu ................ H04L 5/0053
370/329
2013/0242886 A1* 9/2013 Chen ............. H04W 52/243
370/329

FOREIGN PATENT DOCUMENTS

WO 2011013990 A2 2/2011

OTHER PUBLICATIONS

3GPP TS 36.213 V10.9.0 (Feb. 2013), Section 7.1.6.5, pp. 31-32.*
(Continued)

*Primary Examiner* — Melvin Marcelo
(74) *Attorney, Agent, or Firm* — Dentons US LLP

(57) ABSTRACT

The present invention relates to a wireless communication system. A method for estimating a channel by a user equipment (UE) in a wireless communication system includes receiving information about at least one channel station information (CSI) configuration for reporting CSI of one of a plurality of serving cells, determining that the same precoding matrix is applied to a plurality of resource blocks when all of the at least one CSI configuration is configured to report a precoding matrix indicator (PMI) and a rank indicator (RI), and determining that the precoding matrix is applied to one resource block when CSI configuration configured not to report the PMI and the RI is present among
(Continued)

the at least one CSI configuration, and estimating a channel based on a result of the determination.

12 Claims, 11 Drawing Sheets

Related U.S. Application Data filed on Jan. 14, 2013, provisional application No. 61/695,289, filed on Aug. 30, 2012.

(51) Int. Cl.
 *H04L 5/00* (2006.01)
 *H04B 7/0417* (2017.01)

(52) U.S. Cl.
 CPC .......... *H04L 5/0026* (2013.01); *H04L 5/0048* (2013.01); *H04L 5/0073* (2013.01); *H04B 7/0486* (2013.01); *H04L 5/0016* (2013.01); *H04L 5/0023* (2013.01); *H04L 5/0053* (2013.01); *H04L 5/0091* (2013.01)

(56) References Cited

OTHER PUBLICATIONS

3GPP TS 36.213 V11.5.0 (Dec. 2013), Section 7.1.6.5, p. 42.*
Samsung, "Discussion on DM-RS for LTE-Advanced", R1-094088, 3GPP TSG RAN WG1 #58bis, Miyazaki, Japan, Oct. 12-16, 2009.
David Astely, LS on enhanced dual-layer transmission; , R1-095059, 3GPP TSG RAN WG1 Meeting #59, Jeju, Korea, Nov. 9-13, 2009.
Qualcomm Europe, "UE-RS patterns for ranks 5 to 8 of LTE-A", R1-094212, 3GPP TSG-RAN WG1 #58bis, Miyazaki, Japan, Oct. 12-16, 2009.
Sharp, "Impact of the PMI/RI report drop on the PUCCH CQI report", R1-082273, 3GPP TSG RAN WG1 Meeting #53bis, Warsaw, Poland, Jun. 30-Jul. 4, 2008.
"CoMP transmission mode", 3GPP TSG RAN WG1 Meeting #70, Qingdao, China, Aug. 13-17, 2012, pp. 1-7, R1-123106.
"Views on Supporting PMI Disabling in TM9", 3GPP TSG RAN WG1 Meeting #63bis, Dublin, Ireland, Jan. 17-21, 2011, pp. 1-3, R1-110285.
"On remaining issues of PRB bundling size", 3GPP TSG RAN WG1 61bis, Dresden, Germany, Jun. 28-Jul. 2, 2010, pp. 1-4, R1-103695.
"Remaining issues of PRB bundling", 3GPP TSG-RAN WG1 Meeting #61bis, Dresden, Germany, Jun. 28-Jul. 2, 2010, pp. 1-4, R1-103829.
"Explicitly configured PRB bundling", 3GPP TSG RAN WG1 Meeting #61bis, Dresden, Germany, Jun. 28-Jul. 2, 2010, pp. 1-2, R1-104084.
"Remaining issues of PRB bundling", 3GPP TSG-RAN WG1 Meeting #62, Madrid, Spain, Aug. 23-27, 2010, pp. 1-4, R1-104528.
"On non-PMI based feedback in Rel-10", 3GPP TSG-RAN WG1#63, Jacksonville, USA, Nov. 15-19, 2010, pp. 1-5, R1-106313.
"On non-PMI based feedback in Rel-10", 3GPP TSG-RAN WG1 #63bis, Dublin, Ireland, Jan. 17-21, 2011, pp. 1-5, R1-110422.
"On non-PMI based feedback in Rel-10", 3GPP TSG-RAN WG1 #63bis, Dublin, Ireland, Jan. 17-21, 2011, pp. 1-5, R1-110550.
LG Electronics, Catt, Renesas Mobile, Ericsson, ST-Ericsson, ZTE: "Way Forward on UE Assumption for PRB bundling in TM 10", 3GPP TSG RAN WG1 #72, R1-130751, Jan. 28-Feb. 1, 2013.
LG Electronics: "Remaining issue on PRB bundling in TM10", 3GPP TSG RAN WG1 Meeting #72, R1-130245, Jan. 28-Feb. 1, 2013.
CATT: "Discussion on CQI for non-PMI/RI reporting in CoMP and TP for 36.213", 3GPP TSG RAN WG1 Meeting #70bis, R1-124098, Oct. 8-12, 2012.

* cited by examiner

FIG. 5
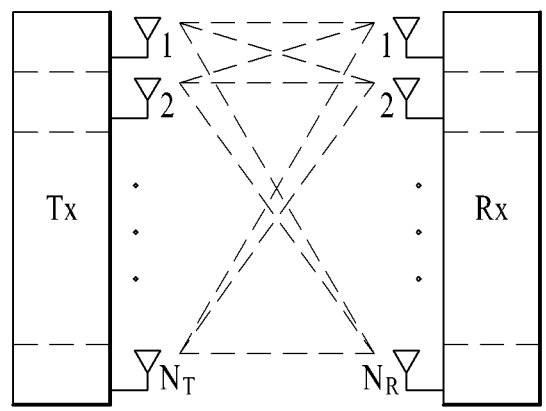
(a)
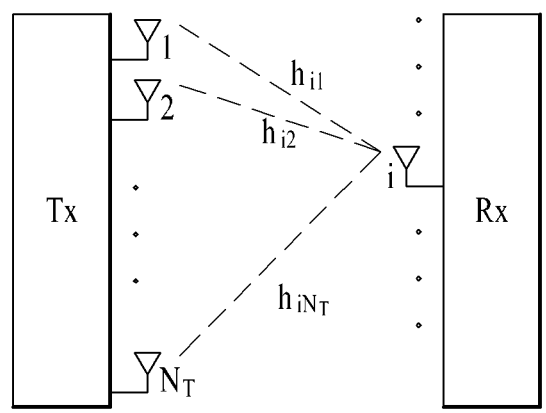
(b)

FIG. 7
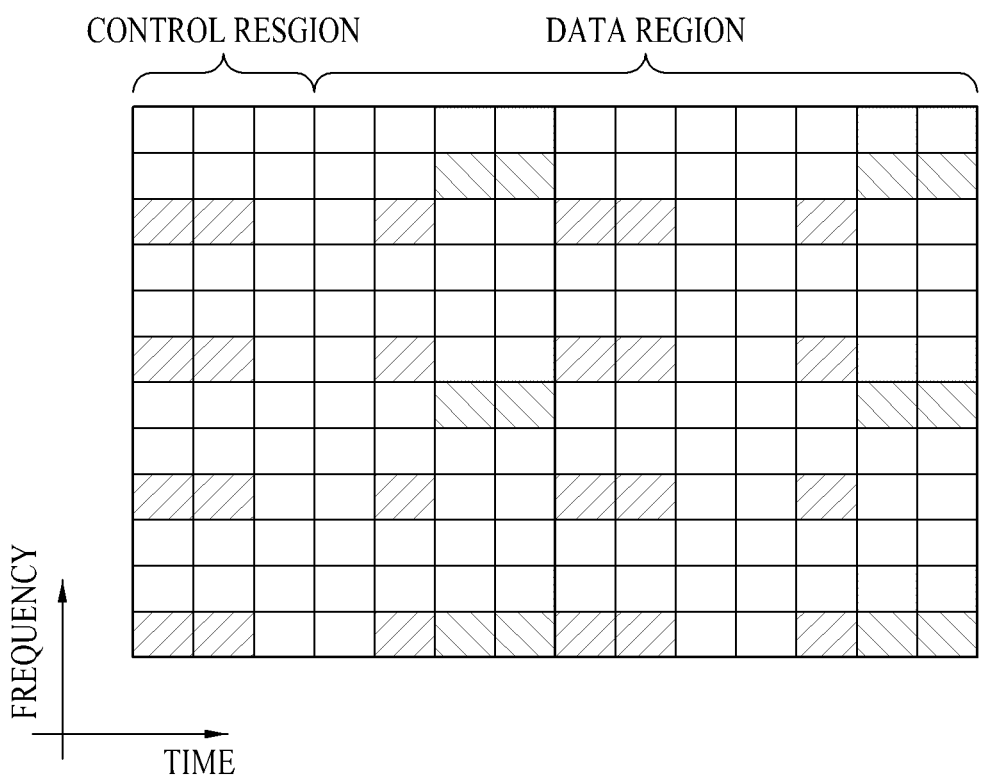
 CRS
 DM RS (CDM group 1)
 DM RS (CDM group 2)

METHOD AND APPARATUS FOR ESTIMATING CHANNEL IN WIRELESS COMMUNICATION SYSTEM

This application is a 35 USC §371 National Stage entry of International Application No. PCT/KR2013/007721 filed on Aug. 28, 2013, which claims priority to U.S. Provisional Application Nos. 61/695,289 filed on Aug. 30, 2012, 61/751,238 filed on Jan. 10, 2013 and 61/752,407 filed on Jan. 14, 2013, each of which is hereby incorporated by reference in its entirety.

TECHNICAL FIELD

The present invention relates to a wireless communication system, and more particularly, to a method and apparatus for estimating a channel, for determining that the same precoding matrix is applied to a plurality of resource blocks when at least one channel state information (CSI) configuration is configured to report a precoding matrix indicator (PMI) and a rank indicator (RI) in a wireless communication system supporting coordinated multi-point (CoMP).

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE

Technical Problem

An object of the present invention devised to solve the problem lies in a method and apparatus for estimating a channel in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for estimating a channel by a user equipment (UE) in a wireless communication system, the method including receiving information about at least one channel station information (CSI) configuration for reporting CSI of one of a plurality of serving cells, determining that the same precoding matrix is applied to a plurality of resource blocks when all of the at least one CSI configuration is configured to report a precoding matrix indicator (PMI) and a rank indicator (RI), and determining that the precoding matrix is applied to one resource block when CSI configuration configured not to report the PMI and the RI is present among the at least one CSI configuration, and estimating a channel based on a result of the determination.

In another aspect of the present invention, provided herein is a method for receiving channel information by a base station (BS) in a wireless communication system, the method including transmitting information about at least one channel station information (CSI) configuration for reporting CSI of one of a plurality of serving cells, applying the same precoding matrix applied to a plurality of resource blocks when all of the at least one CSI configuration is configured to report a precoding matrix indicator (PMI) and a rank indicator (RI), and applying the precoding matrix to one resource block when CSI configuration configured not to report the PMI and the RI is present among the at least one CSI configuration, and receiving information about a channel to which the precoding matrix is applied from a user equipment (UE).

In another aspect of the present invention, provided herein is a user equipment (UE) for estimating a channel in a wireless communication system, the UE including a radio frequency (RF) unit, and a processor, wherein the processor is configured to receive information about at least one channel station information (CSI) configuration for reporting CSI of one of a plurality of serving cells, to determine that the same precoding matrix is applied to a plurality of resource blocks when all of the at least one CSI configuration is configured to report a precoding matrix indicator (PMI) and a rank indicator (RI), to determine that the precoding matrix is applied to one resource block when CSI configuration configured not to report the PMI and the RI is present among the at least one CSI configuration, and to estimate a channel based on a result of the determination.

In another aspect of the present invention, provided herein is a base station (BS) for receiving channel information in a wireless communication system, the BS including a radio frequency (RF) unit, and a processor, wherein the processor is configured to transmit information about at least one channel station information (CSI) configuration for reporting CSI of one of a plurality of serving cells, to apply the same precoding matrix applied to a plurality of resource blocks when all of the at least one CSI configuration is configured to report a precoding matrix indicator (PMI) and a rank indicator (RI), to apply the precoding matrix to one resource block when CSI configuration configured not to report the PMI and the RI is present among the at least one CSI configuration, and to receive information about a channel to which the precoding matrix is applied from a user equipment (UE).

The following features can be commonly applied to the embodiments of the present invention.

The number of the plural resource blocks may be determined based on a system bandwidth when all of the at least one CSI configuration is configured to report the PMI and the RI.

The at least one CSI configuration may be independently configured with respect to whether the PMI and the RI are reported.

Information about the at least one CSI configuration may be transmitted by radio resource control (RRC) signaling.

The method may further include receiving a demodulation reference signal (DM RS).

The estimating may include estimating a channel using the DM RS.

It is to be understood that both the foregoing general description and the following detailed description of the present invention are exemplary and explanatory and are intended to provide further explanation of the invention as claimed.

Advantageous Effects

According to embodiments of the present invention, channel estimation can be more effectively reported in a wireless communication system.

According to the embodiments of the present invention, it may be determined that the same precoding matrix is applied to a plurality of resource blocks when at least one channel state information (CSI) configuration is configured to report a precoding matrix indicator (PMI) and a rank indicator (RI) in a wireless communication system supporting coordinated multi-point (CoMP).

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates the configuration of a MIMO communication system having multiple antennas;

FIG. 7 illustrates an exemplary DM RS pattern defined for the LTE-A system;

BEST MODE

Figure 1:
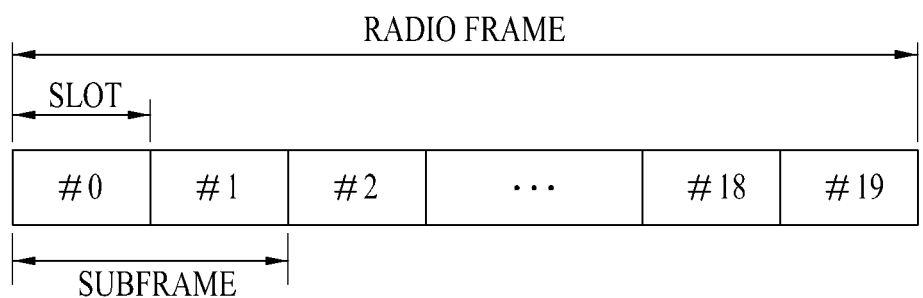
FIG. 1 illustrates the type-1 radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
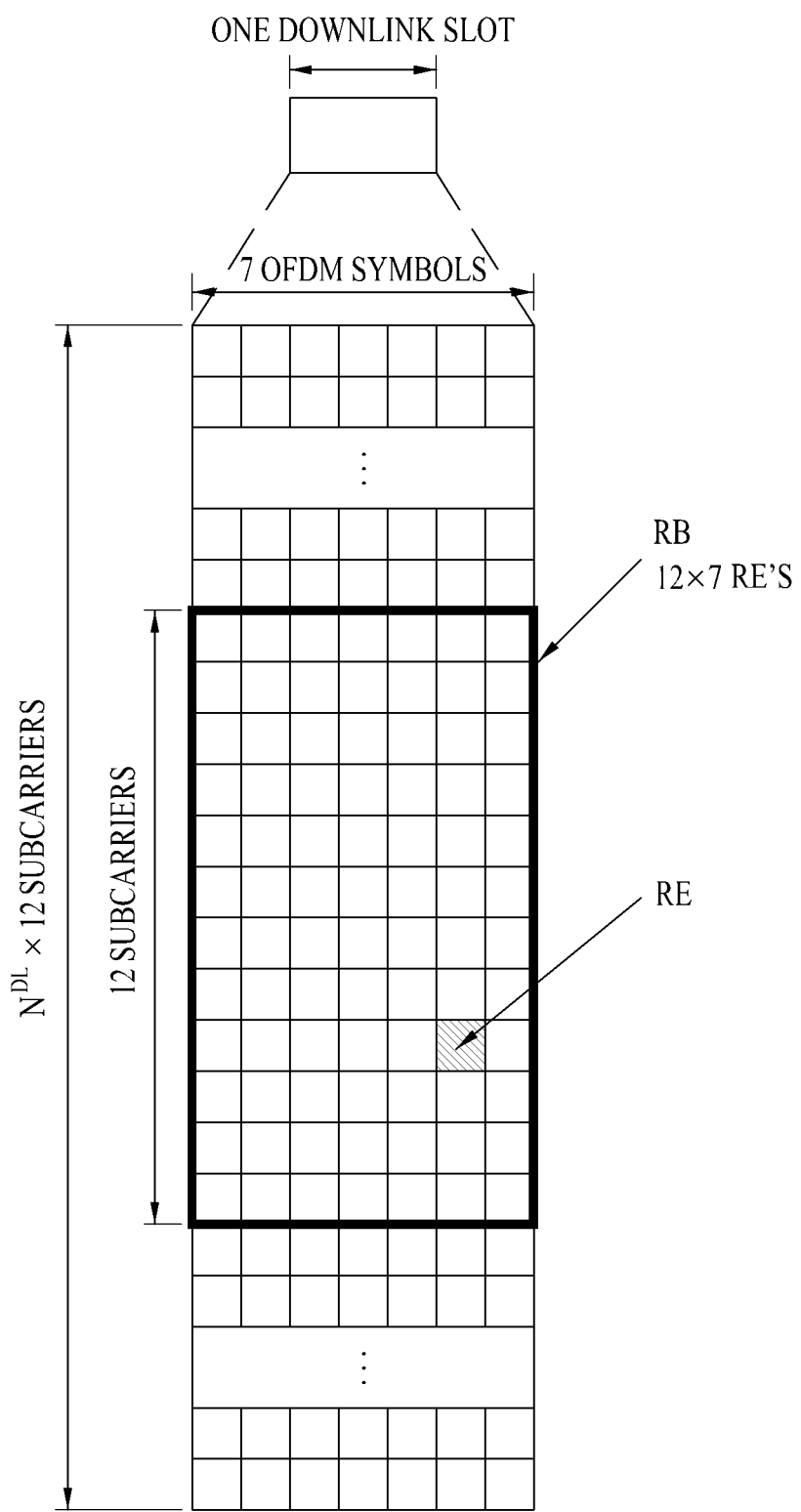
FIG. 2 illustrates the structure of a downlink resource grid for the duration of one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a $k_{th}$ subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
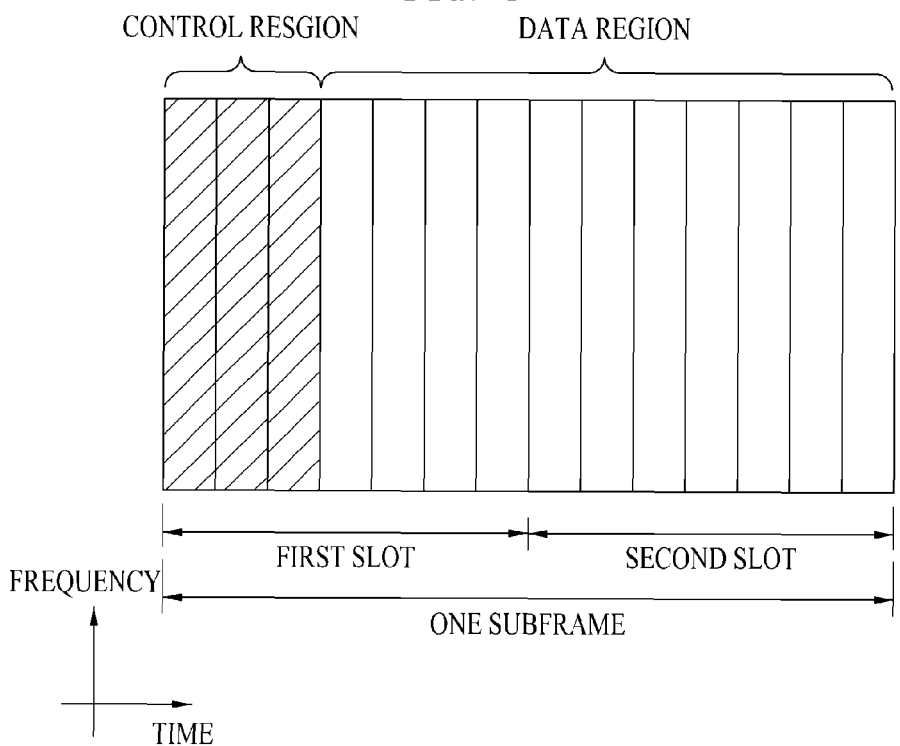
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
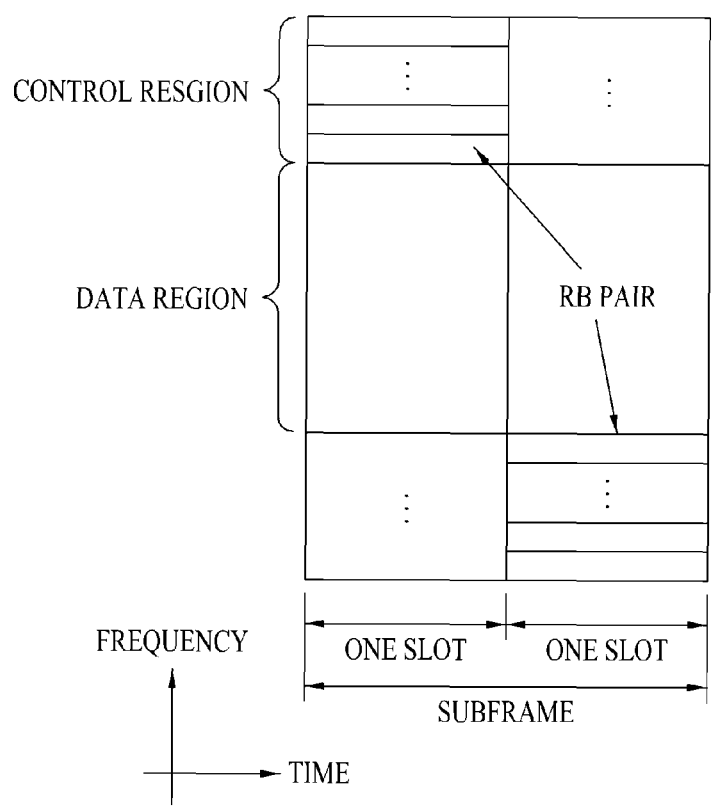
FIG. 4 illustrates the structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a reception signal of each antenna may be expressed as the vector shown in Equation 6 below.

$$y = [y_1, y_2, \ldots, y_{N_R}]^T \quad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T = [h_{i1}, h_{i2}, \ldots, h_{iN_T}] \quad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Additive white Gaussian noise (AWGN) is added to an actual channel which has passed the channel matrix. The AWGN ($n_1, n_2, \ldots, n_{N_R}$) added to each of $N_R$ reception (Rx) antennas can be represented by Equation 9 below.

$$n = [n_1, n_2, \ldots, n_{N_R}]^T \quad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_j} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
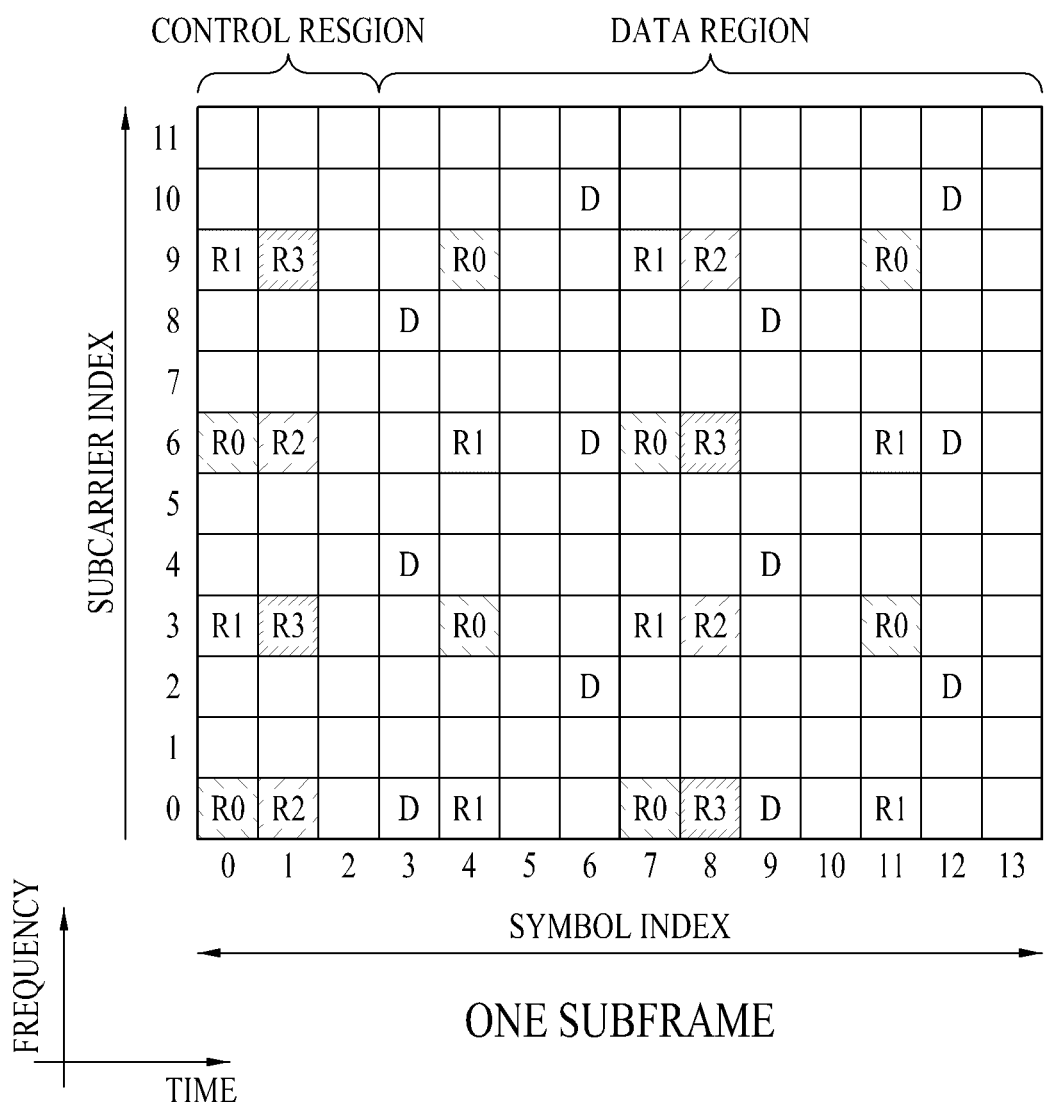
FIG. 6 illustrates a conventional CRS and DRS pattern.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
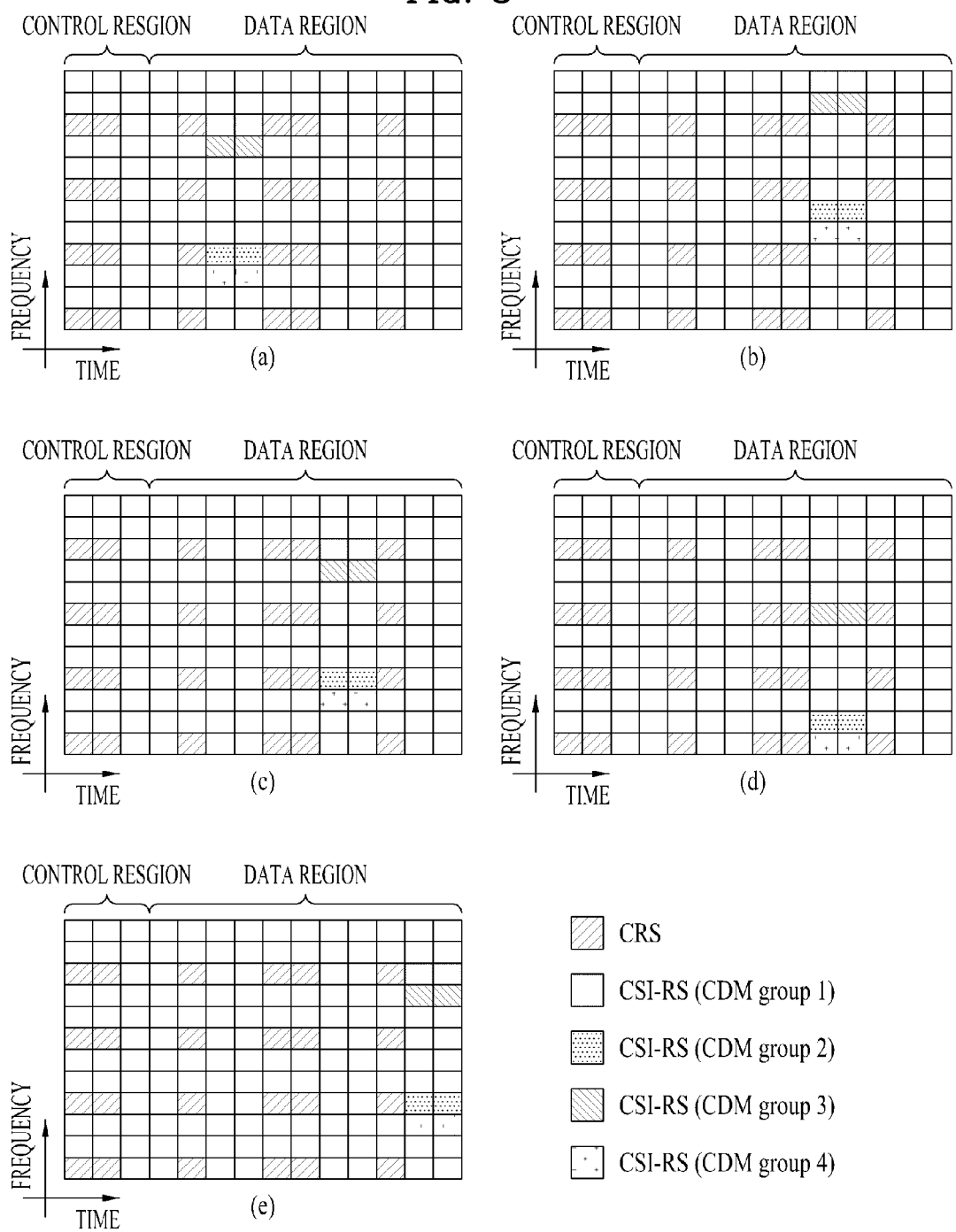
FIG. 8 illustrates exemplary CSI-RS patterns.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Cooperative Multi-Point (CoMP)

To satisfy enhanced system performance requirements for the 3GPP LTE-A system, CoMP transmission and reception technology known as co-MIMO, collaborative MIMO or network MIMO has been proposed. The CoMP technology can increase the performance of UEs located at a cell edge and average sector throughput.

It is known that Inter-Cell Interference (ICI) generally degrades the performance of a UE at a cell edge and average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

Downlink CoMP schemes are classified largely into Joint Processing (JP), and Coordinated Scheduling/Beamforming (CS/CB).

According to the JP scheme, each point (eNB) of a CoMP unit may use data. The CoMP unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP unit) at one time. That is, a plurality of transmission points may simultaneously transmit data to a single UE. The joint transmission scheme can improve the quality of a received signal coherently or non-coherently and actively eliminate interference to other UEs, as well.

Dynamic cell selection is a technique of transmitting a PDSCH from one point of a CoMP unit at one time. That is, one point of the CoMP unit transmits data to a single UE at a given time point, while the other points of the CoMP unit do not transmit data to the UE at the time point. A point to transmit data to a UE may be dynamically selected.

Meanwhile, in the CS/CB scheme, a CoMP unit may perform cooperative beamforming for data transmission to a single UE. While only a serving cell transmits data to the UE, user scheduling/beamforming may be determined through coordination among cells of the CoMP unit.

Uplink CoMP reception refers to uplink reception of a transmitted signal through coordination at a plurality of geographically separated points. Uplink CoMP schemes include Joint Reception (JR) and CS/CB.

In JR, a plurality of reception points receives a signal transmitted on a PUSCH. CS/CB is a technique in which while only one point receives a PUSCH, user scheduling/beamforming is determined through coordination among cells of a CoMP unit.

CSI-RS Configuration

For CoMP scheduling in a network, the UE needs to feedback DL CSI information of an adjacent cell that participates in CoMP as well DL CSI information of serving cell. To this end, the UE may feedback a plurality of CSI processes that reflect various data transmission cell and various interference environments.

Thus, an LTE system uses an interference measurement resource (IMR) for interference measurement during calculation of CoMP CSI. One UE may be configured by a plurality of IMRs which have independent configuration. That is, the IMRs may be configured by independent periods, offsets, and resource configuration, and a BS may signal IMR to a UE via higher-layer signaling (RRC, etc.).

In addition, an LTE system uses CSI-RS in order to measure a channel desired for calculation of CoMP CSI. One UE may be configured by a plurality of CSI-RSs which have independent configurations. That is, each CSI-RS may be configured by independent periods, offsets, resource configuration, power control (Pc), and number of antenna ports. CSI-RS related information may be signaled to a UE from a BS via higher-layer signaling (RRC, etc.).

Among a plurality of CSI-RSs and a plurality of IMRs configured to the UE, one CSI process may be defined in association with one CSI-RS resource for signal measurement and one interference measurement resource (IMR) for interference measurement. The UE feedbacks CSI information obtained via different CSI processes to a network (e.g., a BS) with independent periods and subframe offsets).

That is, each CSI process has independent CSI feedback configurations. The CSI-RS resource, the IMR resource association information, and the CSI feedback configuration may be indicated to the UE by a BS via higher-layer signaling for each respective CSI process. For example, it is assumed that the UE may be configured by three CSI processes shown in Table 1 below.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1 above, CSI-RS 0 and CSI-RS 1 are CSI-RS received from cell 1 that is a serving cell of the UE and CSI-RS received from cell 2 as an adjacent cell that participates in cooperation, respectively. When it is assumed that IMR configured for each respective CSI process of Table 1 above is configured as shown in Table 2 below,

TABLE 2

| IMR | eNB 1 | eNB 2 |
|---|---|---|
| IMR 0 | Muting | Data transmission |
| IMR 1 | Data transmission | Muting |
| IMR 2 | Muting | Muting | with regard to IMR 0, cell 1 performs muting and cell 2 performs data transmission, and the UE is configured to measure interference from cells except for cell 1 based on IMR 0. Similarly, with regard to IMR 1, cell 2 performs muting and cell 1 performs data transmission, and the UE is configured to measure interference from cells except for cell 2 based on IMR 1. In addition, with regard to IMR 2, both cells 1 and 2 perform muting, and the UE is configured to measure interference from cells except for cells 1 and 2 based on IMR 2.

Accordingly, as shown in Tables 1 and 2 above, CSI information of CSI process 0 refers to optimum RI, PMI, and CQI information when data is received from cell 1. CSI information of CSI process 1 refers to optimum RI, PMI, and CQI when data is received from cell 2. CSI information of CSI process 2 refers to optimum RI, PMI, and CQI information when data is received from cell 1 and interference is not generated from cell 2.

CSI processes configured to one UE may share dependent values for CoMP scheduling. For example, in case of joint transmission (JP) of cell 1 and cell 2, when CSI process 1 in which a channel of cell 1 is considered as a signal part and CSI process 2 in which a channel of cell 2 is considered as a signal part are configured to one UE, rank of CSI process 1 and CSI process 2 needs to be the same as a selected subband index in order to easily perform JT scheduling.

The period or pattern for transmitting a CSI-RS may be configured by a BS. In order to measure a CSI-RS, a UE needs to know CSI-RS configuration for each CSI-RS antenna port of a cell to which the UE belongs. The CSI-RS configuration may include a downlink subframe index for transmitting a CSI-RS, a time-frequency location (e.g., the CSI-RS patterns illustrated in FIGS. 8(a) to 8(e)) of a CSI-RS RE in a transmission subframe, and a CSI-RS sequence (which is a sequence used as a CSI-RS and is pseudo-randomly generated according to a predetermined rule based on a slot number, a cell ID, a CP length, etc.). That is, a given BS may use a plurality of CSI-RS configurations and may indicate CSI-RS configuration to be used for UE(s) in a cell of the plural CSI-RS configurations.

In addition, the CSI-RSs for the respective antenna ports need to be differentiated, and thus, resources for transmitting a CSI-RS for each antenna port need to be orthogonal to each other. As described with reference to FIG. 8, CSI-RSs for the respective antenna ports may be multiplexed using orthogonal frequency resources, orthogonal time resources, and/or orthogonal code resources via FDM, TDM, and/or CDM.

Upon informing UEs in a cell of CSI-RS information (CSI-RS configuration), a BS needs to inform the UEs of information about time and frequency to which a CSI-RS about each antenna port is mapped. In detail, the information about time may contain subframe numbers for transmitting the CSI-RS, a period for transmitting the CSI-RS, a subframe offset for transmitting the CSI-RS, an OFDM symbol number for transmitting a CSI-RS RE of a specific antenna, etc. The information about frequency may contain frequency spacing for transmitting a CSI-RS RE of a specific antenna, an offset or shift value of an RE in a frequency axis, etc.

Figure 9:
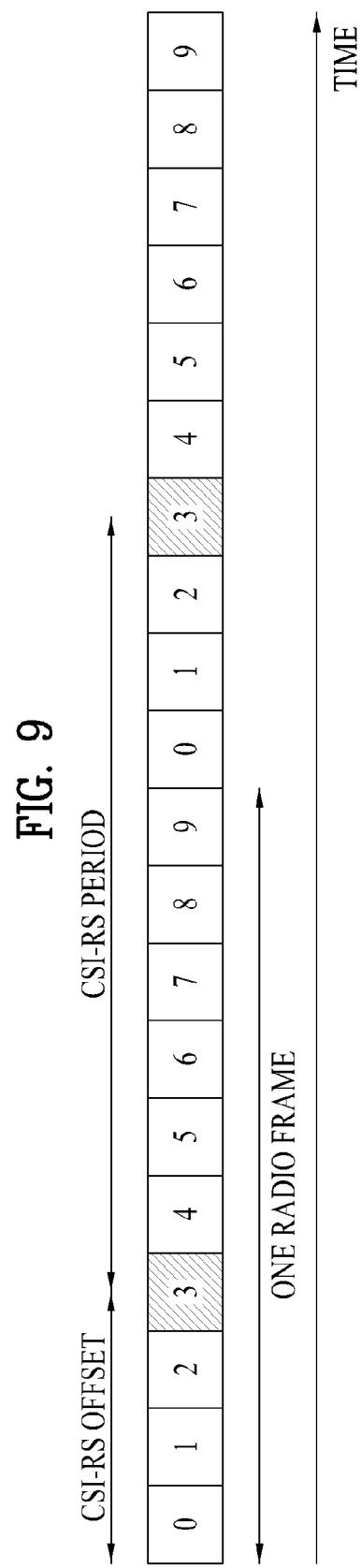
FIG. 9 illustrates an exemplary periodic CSI-RS transmission.

FIG. 9 illustrates an exemplary periodic CSI-RS transmission. A CSI-RS may be transmitted periodically at every integer multiple of one subframe (e.g. in every 5, 10, 20, 40 or 80 subframes).

Referring to FIG. 9, one radio frame is divided into 10 subframes, subframe 0 to subframe 9. The BS transmits a CSI-RS with a CSI-RS transmission period of 10 ms (i.e. in every 10 subframes) and a CSI-RS transmission offset of 3, by way of example. Different BSs may have different CSI-RS transmission offsets so that CSI-RSs transmitted from a plurality of cells is uniformly distributed in time. If a CSI-RS is transmitted every 10 ms, its CSI-RS transmission offset may be one of 0 to 9. Likewise, if the CSI-RS is transmitted every 5 ms, the CSI-RS transmission offset may be one of 0 to 4. If the CSI-RS is transmitted every 20 ms, the CSI-RS transmission offset may be one of 0 to 19. If the CSI-RS is transmitted every 40 ms, the CSI-RS transmission offset may be one of 0 to 39. If the CSI-RS is transmitted every 80 ms, the CSI-RS transmission offset may be one of 0 to 79. A CSI-RS transmission offset indicates a subframe in which a BS starts CSI-RS transmission in every predetermined period. When the BS signals a CSI-RS transmission period and offset to a UE, the UE may receive a CSI-RS from the BS in subframes determined by the CSI-RS transmission period and offset. The UE may measure a channel using the received CSI-RS and thus may report such information as a Channel Quality Indicator (CQI), a PMI, and/or a Rank Indicator (RI) to the BS. Unless a CQI, a PMI and an RI are separately described herein, they may be collectively referred to as a CQI (or CSI). A CSI-RS transmission period and offset may be set separately for each individual CSI-RS configuration.

Figure 10:
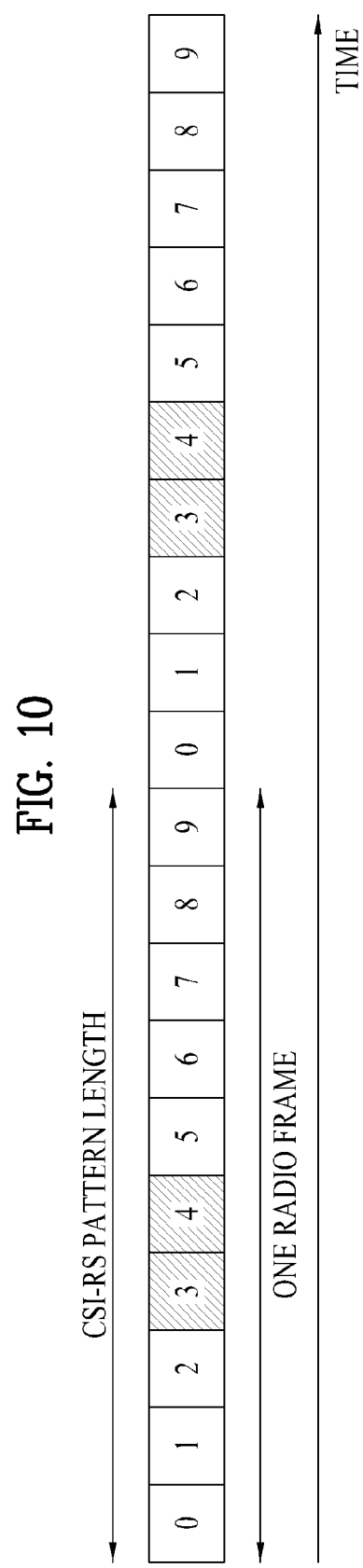
FIG. 10 illustrates an exemplary aperiodic CSI-RS transmission.

FIG. 10 illustrates an exemplary aperiodic CSI-RS transmission. Referring to FIG. 10, one radio frame is divided into 10 subframes, subframe 0 to subframe 9. Subframes carrying CSI-RSs may be indicated in a predetermined pattern. For instance, a CSI-RS transmission pattern may be formed in units of 10 subframes and a 1-bit indicator may be set for each subframe to indicate whether the subframe carries a CSI-RS. In the illustrated case of FIG. 10, the CSI-RS pattern tells that subframe 3 and subframe 4 out of 10 subframes (i.e. subframe 0 to subframe 9) carry CSI-RSs. Such 1-bit indicators may be transmitted to a UE by higher-layer signaling.

Various CSI-RS configurations are available as described above. To enable a UE to receive CSI-RSs reliably for channel measurement, an eNB needs to signal a CSI-RS configuration to the UE. Now a description will be given below of embodiments of the present invention for signaling a CSI-RS configuration to a UE.

CSI-RS Configuration Signaling

In general, the eNB may signal a CSI-RS configuration to the UE in two methods.

One of the methods is for the eNB to broadcast CSI-RS configuration information to UEs by dynamic broadcast channel (DBCH) signaling.

In the legacy LTE system, an eNB may transmit system information to UEs on a broadcast channel (BCH). If the system information is too much to be transmitted on the BCH, the eNB may transmit the system information in the same manner as downlink data transmission. Notably, the eNB may mask the CRC of a PDCCH associated with the system information by an SI-RNTI, instead of a particular UE ID. Thus, the system information is transmitted on a PDSCH like unicast data. All UEs within the cell may decode the PDCCH using the SI-RNTI and thus acquire the system information by decoding the PDSCH indicated by the PDCCH. This broadcasting scheme may be referred to as DBCH signaling, distinguishably from general Physical BCH (PBCH) signaling.

Two types of system information are usually broadcast in the legacy LTE system. One type of system information is a Master Information Block (MIB) transmitted on a PBCH and the other type of system information is a system information block (SIB) multiplexed with general unicast data in a PDSCH region. As the legacy LTE system defines SIB type 1 to SIB Type 8 (SIB1 to SIB8) for system information transmission, a new SIB type may be defined for CSI-RS configuration information which is new system information not defined as any conventional SIB type. For example, SIB9 or SIB10 may be defined and the eNB may transmit CSI-RS configuration information to UEs within its cell in SIB9 or SIB10 by DBCH signaling.

The other method for signaling CSI-RS configuration information is that the BS transmits CSI-RS configuration information to each UE by radio resource control (RRC) signaling. That is, the CSI-RS configuration information may be provided to each UE within the cell by dedicated RRC signaling. For example, while a UE is establishing a connection to the BS during initial access or handover, the BS may transmit the CSI-RS configuration information to the UE by RRC signaling. Alternatively or additionally, the BS may signal the CSI-RS configuration information to the UE in an RRC signaling message requesting a channel state feedback based on CSI-RS measurement to the UE.

CSI-RS Configuration Indication

A random BS may use a plurality of CSI-RS configurations and transmit a CSI-RS according to each CSI-RS configuration to a UE on a predetermined subframe. In this case, the BS may inform the UE of the plural CSI-RS configurations and inform the UE of a CSI-RS to be used for channel state measurement for Channel Quality Information (CQI) or Channel State Information (CSI) feedback among the plurality of CSI-RS configurations.

A description will be given of indication of a selected CSI-RS configuration and CSI-RSs to be used for channel measurement to a UE by a BS according to an embodiment of the present invention.

Figure 11:
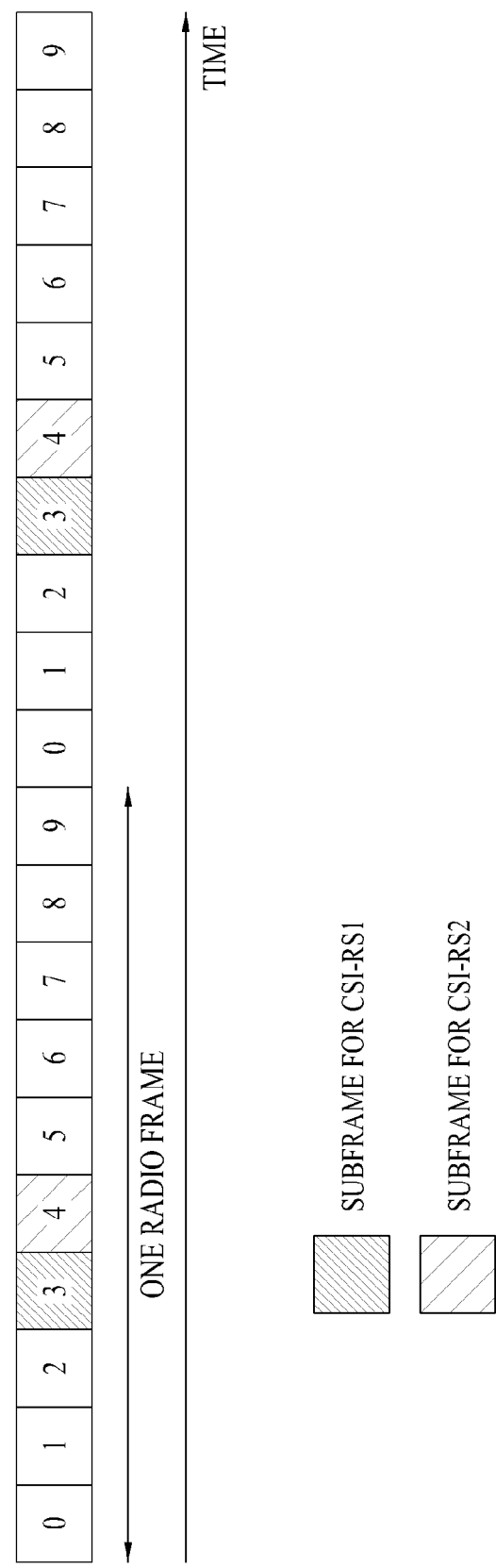
FIG. 11 illustrates an example of using two CSI-RS configurations.

FIG. 11 illustrates an example of using two CSI-RS configurations. Referring to FIG. 11, one radio frame is divided into 10 subframes, subframe 0 to subframe 9. For a first CSI-RS configuration (CSI-RS1), a CSI-RS transmission period is 10 ms and a CSI-RS transmission offset is 3. For a second CSI-RS configuration (CSI-RS2), a CSI-RS transmission period is 10 ms and a CSI-RS transmission offset is 4. The BS may signal the two CSI-RS configurations to the UE and notify the UE of a CSI-RS configuration to be used for CQI (or CSI) feedback.

Upon receipt of a CQI feedback request for a specific CSI-RS configuration from the BS, the UE may measure a channel state using only CSI-RSs having the specific CSI-RS configuration. To be more specific, a channel state is a function of a CSI-RS reception quality, the amount of noise/interference, and a correlation coefficient between them. The CSI-RS reception quality may be measured using only the CSI-RSs having the specific CSI-RS configuration, and the amount of noise/interference and the correlation coefficient (e.g. an interference covariance matrix representing the direction of interference) may be measured in a subframe carrying the CSI-RSs or a predetermined subframe. For example, in FIG. 11, when the BS requests a feedback for the first CSI-RS configuration to the UE, the UE may measure a reception quality using CSI-RSs received in a fourth subframe (subframe index 3) in a radio frame. For the UE to calculate the amount of noise/interference and the correlation coefficient, the BS may indicate an odd-numbered subframe to the UE. Alternatively or additionally, the BS may confine the UE to a specific single subframe (e.g. subframe index 3), for measuring the CSI-RS reception quality and calculating the amount of noise/interference and the correlation coefficient.

For instance, the CSI-RS reception quality may be the Signal-to-Interference plus Noise Ratio (SINR) of the CSI-RSs, expressed as S/(I+N) (S is the strength of the received signal, I is the amount of interference, and N is the amount of noise). The strength of the received signal, S may be measured using CSI-RSs in a subframe carrying the CSI-RSs as well as a signal for the UE. Since I and N vary according to the amount of interference from adjacent cells and the directions of signals from the adjacent cells, they may be measured using CRSs transmitted in a subframe designated for measuring S, or in a separately defined subframe.

The amount of noise/interference and the correlation coefficient may be measured on REs carrying CRSs or CSI-RSs in a subframe or on null REs designated to facilitate noise/interference measurement. To measure noise/interference on CRS REs or CSI-RS REs, the UE may first recover CRSs or CSI-RSs, acquire a noise and interference signal by subtracting the recovered CRSs or CSI-RSs from a received signal, and thus calculate a statistical noise/interference value. A null RE is an empty RE with zero transmission power, carrying no signal. Null REs facilitate measurement of a signal transmitted from a BS other than the BS. While all of CRS REs, CSI-RS REs, and null REs may be used to calculate the amount of noise/interference and the correlation coefficient, the BS may designate specific REs for noise/interference measurement for the UE, among the above REs. This is because appropriate REs need to be set for measurement at the UE depending on a neighbor cell transmits a data signal or a control signal on the REs. The neighbor cell may transmit a data signal or a control signal on the REs according to synchronization or non-synchronization between cells, a CRS configuration, and a CSI-RS configuration. Therefore, the BS may determine the synchronization or non-synchronization between cells, the CRS configuration, and the CSI-RS configuration and designate REs for measurement for the UE according to the determination. That is, the BS may indicate to the UE that the UE will measure noise/interference using all or part of the CRS REs, CSI-RS REs and null REs.

For example, a plurality of CSI-RS configurations is available to the BS. The BS may indicate one or more CSI-RS configurations, and may indicate to the UE a CSI-RS configuration selected for CQI feedback from among the CSI-RS configurations and the positions of null REs, for CSI feedback. The CSI-RS configuration selected for CQI feedback may be a CSI-RS configuration with non-zero transmission power, relative to null REs with zero transmission power. For example, the BS may indicate one CSI-RS configuration for channel measurement to the UE and the UE may assume that CSI-RSs are transmitted with non-zero transmission power in the CSI-RS configuration. Additionally, the BS may indicate a CSI-RS configuration with zero transmission power (i.e. the positions of null REs) to the UE and the UE may assume that the REs of the CSI-RS configuration have non-zero power. In other words, the BS may notify the UE of a CSI-RS configuration with non-zero transmission power and, in the presence of a CSI-RS configuration with zero transmission power, the BS may indicate the positions of null REs in the CSI-RS configuration with zero transmission power to the UE.

As a modification example to the above-described CSI-RS configuration indication method, the BS may signal a plurality of CSI-RS configurations to the UE and may also signal all or part of the CSI-RS configurations, selected for CQI feedback to the UE. Upon receipt of a CQI feedback for a plurality of CSI-RS configurations, the UE may measure CQIs using CSI-RSs corresponding to the CSI-RS configurations and report the CQIs to the BS.

To allow the UE to transmit the CQIs for the respective CSI-RS configurations, the BS may predefine uplink resources for CQI transmission for each CSI-RS configuration and preliminarily provide information about the uplink resources to the UE by RRC signaling.

Additionally, the BS may dynamically trigger CQI transmission for a CSI-RS configuration to the UE. The dynamic triggering of CQI transmission may be carried out through a PDCCH. The PDCCH may indicate a CSI-RS configuration for CQI measurement to the UE. Upon receipt of the PDCCH, the UE may feedback a CQI measurement result for the CSI-RS configuration indicated by the PDCCH to the BS.

CSI-RSs may be set to be transmitted in different subframes or in the same subframe in a plurality of CSI-RS configurations. When CSI-RSs having different CSI-RS configurations are transmitted in the same subframe, it is necessary to distinguish them. To identify the CSI-RSs having different CSI-RS configurations in the same subframe, one or more of CSI-RS time resources, frequency resources, and code resources may be different for them. For example, the positions of REs carrying CSI-RSs may be different for different CSI-RS configurations in time or in frequency (for example, CSI-RSs with a CSI-RS configuration are transmitted on REs illustrated in FIG. 8(a) in a subframe and CSI-RSs with another CSI-RS configuration are transmitted on REs illustrated in FIG. 8(b) in the same subframe) (classification according to time and frequency resources). When CSI-RSs with different CSI-RS configurations are transmitted on the same RE, different CSI-RS scrambling codes may be applied to the CSI-RSs (classification according to code resources).

Quasi Co-Located (QC)

A UE may receive data from all transmission points (TPs) that belongs to coordinated multi-point (CoMP), for example, TP1 and TP2 and thus transmit CSI about all TPs that belong to the CoMP set. In this case, RSs may also be transmitted to the UE from a plurality of TPs in the CoMP set. In this case, when characteristics for channel estimation from different RS ports of different TPs can be shared, load and complexity of reception processing of the UE may be reduced. In addition, when characteristics for channel estimation from different RS ports of the same TP can be shared, load and complexity of reception processing of the UE may be reduced. Accordingly, an LTE-A system has proposed a method for sharing characteristics for channel estimation between RS ports.

For channel estimation between RS ports, the LTE-A system has introduced the concept "quasi co-located (QCL)". For example, when the large-scale property of a radio channel for transmitting a symbol through one antenna port can be inferred from a radio channel for transmitting a symbol through another antenna port, it may be expressed that the two antenna ports are quasi co-located (QCL). Here, the large-scale property includes one or more of delay spread, Doppler spread, Doppler shift, average gain, and average delay. Hereinafter, the quasi co-located will be referred to as QCL.

That is, when two antenna ports are QCL, it means that the large-scale property of a radio channel from one antenna port is the same as the large-scale property of a radio channel from the other antenna port. When different types of RSs are QCL, the large-scale property of a radio channel from one type of antenna port can be replaced with the large-scale property of a radio channel from another type of antenna port.

According to the concept of the QCL, with regard to non-QCL antenna ports, the UE cannot assume the same large-scale property between radio channels from the corresponding antenna ports. That is, in this case, the UE needs to perform independent processing for respective non-QCL antenna ports configured for timing acquisition and tracking, frequency offset estimation and compensation, Doppler estimation, etc.

It is advantageous in that the UE can perform the following operation between antenna ports that can assume QCL. First, the UE can use results of delay spread, Doppler spectrum, and Doppler spread estimation of a radio channel from one antenna port upon estimation of a channel for a radio channel from another antenna port. Then, with respect to frequency shift and reception timing, the UE may perform time and frequency synchronization on one antenna port and then apply the same synchronization on demodulation of another antenna port. Then, with respect to average reception power, the UE can level measurement of reference signal received power (RSRP) of two or more antenna ports.

Upon reception of DM RS-based downlink-associated DCI format through a control channel (PDCCH or ePDCCH), the UE performs channel estimation on the corresponding PDSCH through a DM RS sequence and then performs data demodulation. For example, when the UE can assume configuration of a DM RS port received from downlink scheduling grant to be QCL with a CRS port, the UE can apply the same value as an estimated value of the large-scale property of a radio channel, estimated from a CRS, upon estimation of a channel through the corresponding DM RS port. This is because a CRS is an RS that is broadcast with relatively high density every subframe and all bands, and thus, an estimated value of the large-scale property can be more stably acquired from the CRS, in general. On the other hand, since a DM RS is transmit UE-specifically with respect to a specific scheduled RB, and a precoding matrix used for transmission in PRG units by a BS varies, an effective channel received by the UE may vary in PRG units. Accordingly, when the DM RS is used for estimation of the large-scale property of a radio channel over a wideband, performance may be degraded. Since a CSI-RS has a relatively long transmission period and low density, when the CSI-RS is used for estimation of the large-scale property of the radio channel, performance may also be degraded.

That is, QCL assumption between antenna ports can be applied to reception of various downlink RSs, channel estimation, channel state reporting, etc.

PRB Bundline

PRB bundling refers to application of the same PMI across a plurality adjacent resource blocks during data transmission. In other words, in order to perform PMI/RI reporting, a UE assumes a plurality of resource blocks in the frequency domain as one granularity for precoding.

A system bandwidth is divided into fixed system bandwidths according to precoding resource block group (PRG) size P', and each PRG includes consecutive PRBs. If $N_{RB}^{DL}$ mod P'>0, the size of one of PRGs is $N_{RB}^{DL} - P'\lfloor N_{RB}^{DL}/P' \rfloor$.

As shown in Table 3 below, a PRG size assumed by the UE in an LTE system will be described in more detail. In the LTE system, the PRB size assumed by the UE with respect to a given system bandwidth is defined as shown in Table 3 below.

TABLE 3

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

For example, when a configured downlink bandwidth ($N_{RB}^{DL}$) is 25, the PRG size is defined as 2 as shown in Table 2 above. Accordingly, during PRB bundling, one of PRGs includes one PRB. That is, a system bandwidth is divided into 13 of total PRGs: 12 PRGs including two PRBs; and one PRG including one PRB. In this case, the UE may assume that the same precoder to all scheduled PRBs that belong to one PRG.

PRB Bundling in CoMP System

A legacy LTE system does not support CoMP between BSs, and thus, each UE has one CSI process. Thus, the UE and the BS can obviously determine whether PRB bundling is applied according to whether PMI/RI of the CSI process is reported.

For example, in the legacy LTE system, when the PMI/RI reporting of the CSI process is enabled, PRB bundling can be applied according to system bandwidth. When the PRB bundling is applied, the UE considers channels of adjacent PRBs to which the same precoding is applied, as the same channel, and performs interpolation across adjacent PRBs to which the bundling is applied. As a result, channel estimation performance and demodulation performance can be enhanced. On the other hand, when downlink scheduling is performed using channel reciprocity in a TDD system, the BS can know some properties of a downlink channel from uplink SRS and thus does not have to receive PMI and RI as feedback from the UE. Thus, in this case, it is effective to disable PMI/RI report. In this case, the BS does not apply PRB bundling and estimates a downlink channel in PRB units to configure appropriate PMI and RI.

However, in a CoMP system, the UE needs to feedback channel information of a transmission point or an adjacent cell that participates in CoMP as well as channel information of a serving cell (or a transmission point), to the BS. That is, in the CoMP system, the UE feedbacks CSI according to multiple CSI processes instead of a single CSI process.

Multiple CSI processes configured for one UE may be independently configured. For example, with regard to each CSI process, PMI/RI reporting may be independently enabled or disabled by higher-layer signaling (e.g., RRC signaling). In addition, when a TDD system performs CoMP, a cell receiving weak uplink interference among cells that participates in CoMP can acquire PMI/RI information using channel reciprocity due to different uplink interference environments for the respective cells, but a cell receiving strong uplink interference among the cells cannot acquire PMI/RI information using the channel reciprocity.

Accordingly, it is effective to enable or disable PMI/RI reporting according to whether channel reciprocity is used for each respective CSI process. That is, with regard to some CSI processes among multiple CSI processes, PMI/RI reporting may be enabled, and with regard to the remaining CSI processes, PMI/RI reporting may be disabled.

In the CoMP system, each CSI process of the multiple CSI processes can have independent PMI/RI reporting configuration, a problem arises in terms of whether PRB bundling is applied.

Hereinafter, when each CSI process of the multiple CSI processes has independent PMI/RI reporting configuration, a method for determining whether PRB bundling is applied will be proposed. That is, operations according to the following embodiments of the present invention may be promised between the BS and the UE, thereby preventing ambiguity about whether PRB bundling is applied.

Embodiment 1-1

According to Embodiment 1-1 of the present invention, when PMI/RI reporting of at least one CSI process among CSI processes configured for one serving cell is enabled, a UE assumes that PRB bundling is applied to DM RS and performs demodulation upon reception of data from a BS. That is, when PMI/RI reporting of at least one CSI process among multiple CSI processes configured for one serving cell is enabled, the BS applies PRB bundling to data and DM RS during data transmission. The UE can perform channel interpolation using the DM RS in PRB group (PRG) units to which the bundling is applied and can more accurately estimate a channel. Then, the UE performs data demodulation based on the estimated channel.

Similarly, when PMI/RI reporting of all CSI processes configured for one serving cell is disabled, the UE assumes that PRB bundling is not applied to DM RS and performs demodulation upon reception of data from a BS. That is, when PMI/RI reporting of all CSI processes configured for one serving cell is disabled, the BS does not apply PRB bundling to data and DM RS during data transmission. The UE performs channel estimation for each respective PRB using DM RS. Then, the UE performs data demodulation based on the estimated channel.

Embodiment 1-2

According to Embodiment 1-2 of the present invention, when PMI/RI reporting of at least one CSI process among CSI processes configured for one serving cell is disabled, a UE assumes that PRB bundling is not applied to DM RS and performs demodulation upon reception of data from a BS. That is, when PMI/RI reporting of at least one CSI process among multiple CSI processes configured for one serving cell is disabled, the BS does not apply PRB bundling to data and DM RS during data transmission. The UE performs channel estimation using DM RS for each respective PRB. Then, the UE performs data demodulation based on the estimated channel.

Similarly, when PMI/RI reporting of all CSI processes configured for one serving cell is enabled, the UE assumes that PRB bundling is applied to DM RS and performs demodulation upon reception of data from a BS. That is, when PMI/RI reporting of all CSI processes configured for one serving cell is enabled, the BS applies PRB bundling to data and DM RS during data transmission. The UE performs channel interpolation using DM RS in PRB group (PRG) units to which the bundling is applied and can more accurately estimate a channel. Then, the UE performs data demodulation based on the estimated channel.

Figure 12:
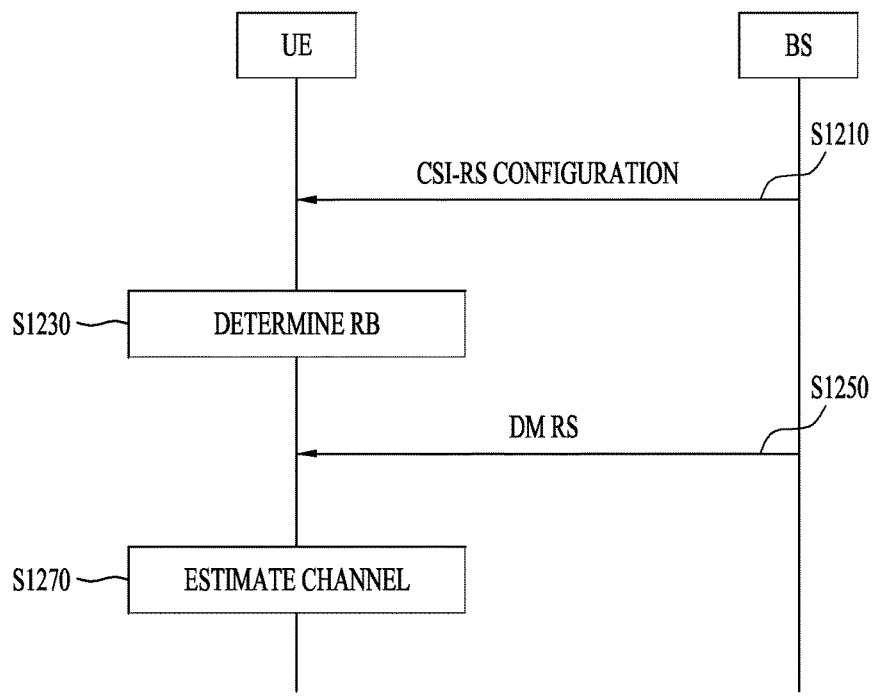
FIG. 12 is a flowchart of a channel estimation method according to an embodiment of the present invention.

FIG. 12 is a flowchart of a channel estimation method according to Embodiment 1-2 of the present invention.

First, a UE receives information about at least one channel state information (CSI) configuration for reporting CSI of a serving cell (S1201). A detailed description of the CSI configuration is the same as the above configuration, and thus, will be omitted here.

Then, when all of at least one CSI configuration configured for a serving cell is configured to report PMI/RI, the UE determines that the same precoding matrix is applied to a plurality of resource blocks, and when CSI configuration that is configured not to report PMI/RI among at least one CSI configuration is present, the UE determines that a precoding matrix is applied to one resource block (S1203).

That is, when PMI/RI reporting of at least one CSI process of multiple CSI processes configured for one serving cell is disabled, the BS does not apply PRB bundling to data and DM RS during data transmission. When PMI/RI reporting of all configured CSI processes is enabled, the UE assumes that PRB bundling is applied to DM RS and performs demodulation upon reception of data from the BS.

Then, the UE receives DM RS from the BS (S1205). In this case, the UE may receive DM RS in consideration of whether PRB bundling is applied. When PMI/RI reporting of at least one CSI process of multiple CSI processes for a serving cell is disabled, the UE determines that PRB bundling is not applied and receives DM RS. When PMI/RI reporting of all CSI processes configured for a serving cell is enabled, the UE determines that PRB bundling is applied and receives DM RS.

Then, the UE estimates a channel based on a result of the aforementioned determination step (S1207). The UE may receive DM RS based on whether PRB bundling is applied, estimate a channel using the received DM RS, and demodulate data.

Embodiment 1-3

According to Embodiment 1-1 or 1-2, whether PRB bundling is applied is semi-statically determined according to configuration of multiple CSI processes. Embodiment 1-3 proposes a method in which a UE dynamically determines whether PRB bundling is applied using QCL information transmitted through DCI. In addition, the UE may add a new field to DCI other than QCL information to indicate whether PRB bundling is applied.

In a QCL environment, the BS signals QCL information about a cell (or a transmission point) from which DM RS is transmitted, to the UE using a DCI field such that the UE appropriately performs data demodulation. That is, the BS may signal a channel corresponding to a CSI process among configured multiple CSI processes, through which DM RS is transmitted, to the UE using a specific field of DCI. For example, when the BS may add a 2-bit field to DCI and the corresponding bits are 00, 01, and 10, the bits may indicate a first CSI process, a second CSI process, and a third CSI process, respectively, to indicate QCL information. That is, in the case of 00, the UE assumes that the received DM RS is transmitted from a channel corresponding to the first CSI process and performs data demodulation.

That is, in a QCL environment, the UE may determine whether PRB bundling is applied to DM RS based on QCL information (i.e., CSI process information) received through DCI.

When PMI/RI reporting of the CSI process signaled to the UE by the BS using QCL information is disabled, the UE assumes that PRB bundling is not applied to DM RS and performs demodulation during data reception. That is, when PMI/RI reporting of the CSI process signaled to the UE by the BS using QCL information is disabled, the BS does not apply PRB bundling to data and DM RS during data transmission. The UE performs channel estimation using DM RS for each respective PRB. Then, the UE performs data demodulation based on the estimated channel.

Similarly, when PMI/RI reporting of the CSI process signaled to the UE by the BS using QCL information is enabled, the UE assumes that PRB bundling is applied to DM RS and performs demodulation during data reception. That is, when PMI/RI reporting of the CSI process signaled to the UE by the BS using QCL information is enabled, the BS applies PRB bundling to data and DM RS during data transmission. The UE performs channel estimation using DM RS in PRB group units (e.g., in PRG units) to which bundling is applied and can more accurately estimate a channel. Then, the UE performs data demodulation based on the estimated channel.

Embodiment 1-4

When N or more CSI process, PMI/RI reporting of which is enabled, among CSI processes configured for one serving cell, a UE assumes that PRB bundling is applied to DM RS and performs demodulation upon reception of data from a BS. That is, when N or more CSI process, PMI/RI reporting of which is enabled, among CSI processes configured for one serving cell, the BS applies PRB bundling to data and DM RS during data transmission. The UE can perform channel interpolation using the DM RS in PRB group (e.g., PRG) units to which the bundling is applied and can more accurately estimate a channel. Then, the UE performs data demodulation based on the estimated channel. N is a static value or is semi-statically determined by RRC signaling, etc.

Hereinafter, a method for determining whether PRB bundling is applied when whether PMI/RI is reported is independently configured for each respective multiple non-zero-power (NZP) CSI-RS will be proposed. Since only a cell corresponding to a specific CSI process transmits data in a CoMP system, all configured CSI processes may not be considered. Accordingly, all configured CSI processes are not considered and whether PRB bundling is applied may be determined with respect to only a CSI process corresponding to a cell that actually transmits data based on NZP CSI-RS.

Embodiment 2-1

When PMI/RI reporting is enabled with respect to at least one NZP CSI-RS among configured NZP CSI-RSs, a UE assumes that PRB bundling is applied to DM RS and performs demodulation upon reception of data from a BS. That is, when PMI/RI reporting is enabled with respect to at least one NZP CSI-RS among NZP CSI-RSs configured for one UE, the BS applies PRB bundling to data and DM RS during data transmission. The UE can perform channel interpolation using the DM RS in PRB group (e.g., PRG) units to which the bundling is applied and can more accurately estimate a channel. Then, the UE performs data demodulation based on the estimated channel.

Similarly, when PMI/RI reporting is disabled with respect to all configured NZP CSI-RSs, the UE assumes that PRB bundling is not applied to DM RS and performs demodulation upon reception of data from the BS. That is, when PMI/RI reporting is disabled with respect to all NZP CSI-RSs configured for one UE, the BS does not apply PRB bundling to data and DM RS during data transmission. The UE performs channel estimation using DM RS for each respective PRB. Then, the UE performs data demodulation based on the estimated channel.

Embodiment 2-2

When PMI/RI reporting is disabled with respect to at least one NZP CSI-RS among configured NZP CSI-RSs, a UE assumes that PRB bundling is not applied to DM RS and performs demodulation upon reception of data from a BS. That is, when PMI/RI reporting is disabled with respect to at least one NZP CSI-RS among NZP CSI-RSs configured for one UE, the BS does not apply PRB bundling to data and DM RS during data transmission. The UE performs channel estimation using DM RS for each respective PRB. Then, the UE performs data demodulation based on the estimated channel.

Similarly, when PMI/RI reporting is enabled with respect to all configured NZP CSI-RSs, the UE does not assume that PRB bundling is applied to DM RS and performs demodulation upon reception of data from a BS. That is, when PMI/RI reporting is enabled with respect to all NZP CSI-RSs configured for one UE, the BS applies PRB bundling to data and DM RS during data transmission. The UE can perform channel interpolation using the DM RS in PRB group (e.g., PRG) units to which the bundling is applied and can more accurately estimate a channel. Then, the UE performs data demodulation based on the estimated channel.

Embodiment 2-3

According to Embodiment 2-1 or 2-2, whether PRB bundling is applied is semi-statically determined according to configuration of NZP CSI-RS configuration. Embodiment 2-3 proposes a method in which a UE dynamically determines whether PRB bundling is applied using QCL information transmitted through DCI.

In a QCL environment, the BS signals QCL information about a transmission point from which DM RS is transmitted, to the UE using a DCI field such that the UE appropriately performs data demodulation. That is, the BS may signal a channel for transmitting NZP CSI-RS among configured multiple NZP CSI-RSs, through which DM RS is transmitted, to the UE using a specific field of DCI. For example, when the BS may add a 2-bit field to DCI and the corresponding bits is 00, 01, and 10, the bits may indicate a first NZP CSI-RS, a second NZP CSI-RS, and a third NZP CSI-RS, respectively, to indicate QCL information. That is, in the case of 00, the UE assumes that the received DM RS is transmitted from a channel through which the first NZP CSI-RS is transmitted and performs data demodulation.

That is, in a QCL environment, the UE may determine whether PRB bundling is applied to DM RS based on QCL information (i.e., NZP CSI-RS information) received through DCI.

When PMI/RI reporting of the NZP CSI-RS signaled to the UE by the BS using QCL information is disabled, the UE assumes that PRB bundling is not applied to DM RS and performs demodulation during data reception. That is, when PMI/RI reporting of the NZP CSI-RS signaled to the UE by the BS using QCL information is disabled, the BS does not apply PRB bundling to data and DM RS during data transmission. The UE performs channel estimation using DM RS for each respective PRB. Then, the UE performs data demodulation based on the estimated channel.

Similarly, when PMI/RI reporting of the NZP CSI-RS signaled to the UE by the BS using QCL information is enabled, the UE assumes that PRB bundling is applied to DM RS and performs demodulation during data reception. That is, when PMI/RI reporting of the NZP CSI-RS signaled to the UE by the BS using QCL information is enabled, the BS applies PRB bundling to data and DM RS during data transmission. The UE performs channel estimation using DM RS in PRB group units (e.g., in PRG units) to which bundling is applied and can more accurately estimate a channel. Then, the UE performs data demodulation based on the estimated channel.

Embodiment 3-1

According to Embodiment 1-1, 1-2, or 1-4, whether PRB bundling is applied is determined based on all CSI processes configured for one cell. That is, when the standard of Embodiment 1-1, 1-2, or 1-4 is applied to all CSI processes configured for one cell and is satisfied, PRB bundling is applied.

However, CSI processes corresponding to actual data transmission to a UE are no more than some of the all CSI processes. For example, when three CSI processes are configured for one serving cell as shown in Tables 1 and 2 above, if cell 2 as an adjacent cell transmits data through DPS, a CSI process corresponding to actual data transmission is only CSI process 2. Accordingly, it is ineffective to apply the standard for PRB bundling to all CSI processes.

For a more effective operation, the present invention proposes reduction in objects of CSI processes to which the standard of PRB bundling is applied using QCL information transmitted through PQI. For example, a UE acquires NZP CSI-RS information of a cell that participates in actual data transmission through PQI and applies the standard of PRB bundling in consideration of only a process using the NZP CSI-RS among CSI processes configured for the UE. That is, according to the aforementioned embodiment, when NZP CSI-RS determined as PQI is NZP CSI-RS 1, the UE determines whether PRB bundling is applied with respect to CSI process 1 in consideration of Embodiments 1-1, 1-2, or 1-4. In addition, according to the aforementioned embodi-ment, when NZP CSI-RS determined as PQI is NZP CSI-RS 0, the UE determines whether PRB bundling is applied with respect to CSI processes 0 and 2 in consideration of Embodiments 1-1, 1-2, or 1-4.

When an LTE release-11 UE receives DCI format 1A in a transmission mode 10, PQI information is first state information among four states of PQI defined in DCI format 2D. Thus, in this case, a CSI process using NZP CSI-RS corresponding to the first PQI state is selected and the standard of PRB bundling of Embodiment 1-1, 1-2, or 1-4 is applied in consideration of the CSI process.

Embodiment 3-2

In Embodiment 3-1, QCL behavior B (QCLBB) defined in LTE release-11 operates without any problem. This is because, in the case of QCLBB, a UE can obtain NZP CSI-RS information corresponding to an actual data transmission channel from PQI information. However, in the case of QCL behavior A (QCLBA) that assumes QCL between serving cell CRS, and NZP CSI-RS and DM RS (or between all ports), PQI information does not contain NZP CSI-RS information. Accordingly, an operation of Embodiment 3-1 needs to be corrected in consideration of this fact.

LTE release-11 basically assumes partial QCL between NZP CSI-RS and CRS. As described above, the QCLBB assumes partial QCL between NZP CSI-RS and CRS. In this case, CRS and partial QCL NZP CSI-RS are signal to the UE by RRC signaling. In other words, CRSs of a specific cell is mapped to respective NZP CSI-RS configurations, and the UE assumes QCL between NZP CSI-RS and CRS with reference to a mapping table. According to the present invention, for convenience of description, the mapping table is referred to as "CRS to NZP CSI-RS QCL mapping table".

The partial QCL refers to partial QCL information among various pieces of QCL information and refers to only {Doppler spread and Doppler shift} in behavior B. On the other hand, the QCLBA assumes QCL with respect to numerous information including the partial QCL, that is, {(Doppler shift and Doppler spread), average delay, and delay spread)} and assumes QCL between all CRS, NZP CSI-RS, and DM RS ports configured for the UE.

Thus, when the UE is configured to QCLBA, the UE first assumes QCL between DM RS and serving cell CRS (for example, because QCLBA can be interpreted as a case in which all ports are QCL). In this case, NZP CSI-RS mapped to serving-cell CRS can be confirmed using the CRS to NZP CSI-RS QCL mapping table received by RRC signaling for QCLBB. In the present invention, for convenience of description, NZP CSI-RS is referred to as "standard NZP CSI-RS".

In Embodiment 3-1, NZP CSI-RS information of a cell that participates in actual data transmission through PQI and a CSI process to which PRB bundling standard is to be applied is selected using the NZP CSI-RS. However, on the other hand, in Embodiment 3-2, a CSI process to which the PRB bundling standard is to be applied is selected using the standard NZP CSI-RS. For example, the UE acquires that standard NZP CSI-RS information through the aforementioned process and applies the PRB bundling standard in consideration of only a process using the NZP CSI-RS among CSI processes configured to the UE. That is, in the examples of Tables 1 and 2, when the standard NZP CSI-RS is NZP CSI-RS 1, the UE determines whether PRB bundling is applied with respect to CSI process 1 in consideration of Embodiment 1-1, 1-2, or 1-4. In addition, in the examples of Tables 1 and 2, when the standard NZP CSI-RS is NZP CSI-RS 0, the UE determines whether PRB bundling is applied with reference to CSI processes 0 and 2 in consideration of Embodiment 1-1, 1-2, or 1-4.

In CoMP scenario 4, adjacent cells share the same cell ID, and thus, one serving cell CRS are mapped to various NZP CSI-RSs in the CRS to NZP CSI-RS QCL mapping table. In this case, Embodiment 3-2 has various standard NZP CSI-RSs. Likewise, when various standard NZP CSI-RSs are present, Embodiment 3-2 can be extensively applied. That is, the UE recognizes CSI processes using one NZP CSI-RS among standard NZP CSI-RSs and determines whether PRB bundling is applied with respect to the CSI processes using Embodiment 1-1, 1-2, or 1-4.

In the case of QCLBA, when the UE is not configured by the CRS to NZP CSI-RS QCL mapping table, Embodiment 1-1, 1-2, or 1-4 is used.

Embodiment 4

More briefly, when multiple CSI processes are configured to a UE, the UE assumes that PRB bundling is not applied to DM RS and performs demodulation upon reception of data from a BS. That is, when the multiple CSI processes are configured to one UE, the BS does not apply data and DM RS during data transmission. The UE performs channel estimation using DM RS for each respective PRB. Then, the UE performs data demodulation based on the estimated channel.

Embodiment 5

More briefly, when multiple CSI processes are configured to a UE, the UE assumes that PRB bundling is applied to DM RS and performs demodulation upon reception of data from a BS. That is, when the multiple CSI processes are configured to one UE, the BS applies data and DM RS during data transmission. The UE can perform channel interpolation using the DM RS in PRB group (PRG) units to which the bundling is applied and can more accurately estimate a channel. Then, the UE performs data demodulation based on the estimated channel.

Different methods of the aforementioned embodiments can be applied according to QCL behaviors. For example, in the case of QCLBA, Embodiment 4 or 5 may be used, and in the case of QCLBB, Embodiment 3-1 may be used.

Embodiment 6

When multiple CSI processes are configured for a UE, the UE determines whether PRB bundling is applied based on a CSI process with a lowest index. That is, when the multiple CSI processes are configured for one UE, if RI/PMI reporting is enabled with respect to the CSI process with a lowest index, a BS applies PRB bundling to data and PRB bundling during data transmission.

When RI/PMI reporting is enabled with respect to the CSI process with a lowest index, the UE assumes that PRB bundling is applied to DM RS and performs demodulation upon reception of data from the BS. The UE may perform channel interpolation using DM RS in PRB group units (e.g., in PRG units) to which bundling is applied and can more accurately estimate a channel. Then, the UE performs data demodulation based on the estimated channel.

When RI/PMI reporting is disabled with respect to the CSI process with a lowest index, the UE does not apply bundling.

Embodiment 7

In frequency selective DPS of a CoMP operation, one UE receives data from cell A of a specific PRB in a specific subframe and receives data from cell B of another PRB. When PRBs that receive data from cell A and cell B are referred to as PRB-A and PRB-B, respectively, the UE should not group PRB-A and PRB-B to one PRB bundle. This is because PRB-A and PRB-B have different reception channels due to different transmission channels.

Accordingly, in order to prevent faulty operations of PRB bundling in the frequency selective DPS, a BS asks the UE not to apply PRB bundling in the corresponding subframe by dynamic signaling such as DCI during the frequency selective DPS. In addition, when the UE can know whether the frequency selective DPS is applied, the UE does not expect PRB bundling between PRB-A and PRB-B during data reception through the frequency selective DPS.

Embodiment 8

More briefly, whether PRB bundling is applied may be semi-statically signaled to a UE by RRC signaling. When PRB bundling is enabled by RRC signaling, the UE performs PRB bundling, and otherwise, the UE does not perform PRB bundling. In an LTE release-10 system, even if whether PRB bundling is applied is not signaled by RRC signaling, multiple CSI processes are configured in release-11, and thus whether PRB bundling is applied may be signaled by RRC signaling, which is one solution. An LTE release-11 UE defines whether PRB bundling is applied in different ways according to a transmission mode. For example, in transmission mode 10, whether bundling is applied is determined by the above proposed RRC signaling. In transmission mode 9, whether bundling is applied is determined using a conventional method. Here, a new field may be added to DCI instead of RRC signaling to signal whether PRB bundling is applied.

In addition, Embodiment 8 may be combined with the aforementioned embodiments. For example, when Embodiment 8 is combined with Embodiment 1-2 above, if PMI/RI reporting of all CSI processes is enabled, the UE performs PRB bundling, and if PMI/RI reporting of all CSI processes is disabled, the UE does not perform PRB bundling. In addition, when a CSI process, PMI/RI reporting of which is disabled, and a CSI process, PMI/RI reporting of which is enabled, are combined, whether PRB bundling is applied is determined by the RRC signaling.

As another example, when Embodiment 3-1 above and Embodiment 1-2 above are combined, the UE selects a CSI process using PQI information in a manner of Embodiment 3-1 above. Then, the UE applies Embodiment 1-2 to the selected CSI process. In this case, when PMI/RI reporting of the all selected CSI processes is enabled, the UE performs PRB bundling, and when PMI/RI reporting of the all selected CSI processes is disabled, the UE does not perform PRB bundling. In addition, when a CSI process, PMI/RI reporting of which is disabled, and a CSI process, PMI/RI reporting of which is enabled, are combined, whether PRB bundling is applied is determined by the RRC signaling.

Alternatively, Embodiment 8 may be embodied according to QCLB. For example, in the case of QCLBB, whether PRB bundling is applied is determined using added proposal 1, and in the case of QCLBA, PRB bundling is applied is determined by RRC signaling.

In addition, RRC signaling of PRB bundling may be transmitted to the UE according to PQI states. For example, whether PRB bundling is applied may be independently signaled by RRC signaling according to PQI 4 state (state). After the UE acquires PQI information contained in DCI, the UE maps RRC signaling corresponding to the corresponding PQI state to determine whether PRB bundling is applied.

Figure 13:
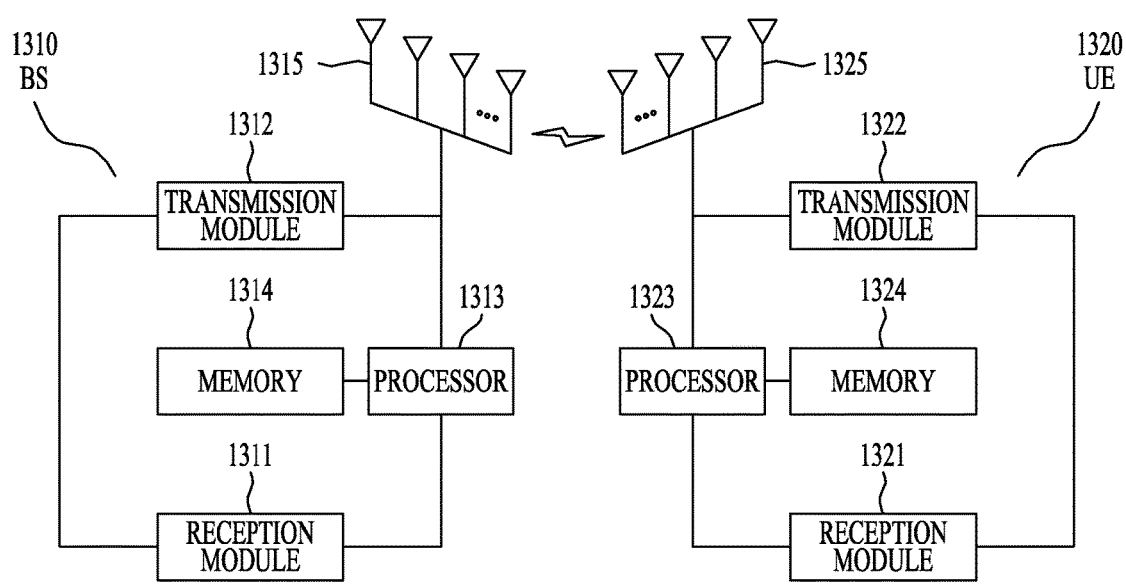
FIG. 13 is a diagram illustrating a BS and a UE to which an embodiment of the present invention can be applicable.

FIG. 13 is a diagram illustrating a BS and a UE to which an embodiment of the present invention can be applicable.

When a relay is included in a wireless communication system, communication in backhaul link is performed between the BS and the relay and communication in access link is performed between the relay and the UE. Accordingly, the BS and UE illustrated in FIG. 13 can be replaced by a relay according to a situation.

Referring to FIG. 13, a wireless communication system includes a BS 1310 and a UE 1320. The BS 1310 includes a processor 1313, a memory 1314, and a radio frequency (RF) unit 1311 and 1312. The processor 1313 may be configured to embody procedures and/or methods proposed according to the present invention. The memory 1314 is connected to the processor 1313 and stores various information related to an operation of the processor 1313. The RF unit 1311 and 1312 is connected to the processor 1313 and transmits/receives a radio signal. The UE 1320 includes a processor 1323, a memory 1324, and an RF unit 1321 and 1322. The processor 1323 may be configured to embody procedure and/or methods proposed according to the present invention. The memory 1324 is connected to the processor 1323 and stores various information related to an operation of the processor 1323. The RF unit 1321 and 1322 is connected to the processor 1323 and transmits/receives a radio signal. The BS 1310 and/or the UE 1320 may have a single antenna or a multiple antenna.

The aforementioned embodiments of the present invention described are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments according to the present invention can be implemented by various means, for example, hardware, firmware, software, or combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor.

The memory unit may be located inside or outside the processor to transmit and receive data to and from the processor through various means which are well known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention can be applied to a wireless communication system such as a user equipment (UE), a relay, a base station (BS), etc.

The invention claimed is:

1. A method for receiving data from a base station by a user equipment in a wireless access system, the method comprising:
   receiving information on a plurality of channel state information (CSI) processes for reporting CSI; and
   receiving the data from the base station,
   wherein the data is processed by using a Physical Resource Block (PRB) bundling only if all of the plurality of CSI processes are configured for reporting a precoding matrix indicator (PMI) and a rank indicator (RI), and
   wherein the data is processed without using the PRB bundling if at least one of the plurality of CSI processes is not configured for reporting the PMI and the RI.

2. The method of claim 1, wherein a number of consecutive PRBs included in one precoding resource group (PRG) is determined according to a system bandwidth when the data is processed by using the PRB bundling.

3. The method of claim 1, wherein the information on the plurality of CSI processes is received using a Radio Resource Control (RRC) signaling.

4. The method of claim 1, further comprising:
receiving a demodulation reference signal (DM-RS).

5. The method of claim 4, further comprising:
measuring a channel using the DM-RS.

6. A method for transmitting data to a user equipment by a base station in a wireless access system, the method comprising:
transmitting information on a plurality of channel state information (CSI) processes for reporting CSI; and
transmitting the data based on whether or not a Physical Resource Block (PRB) bundling is used,
wherein the data is processed by using the PRB bundling only if all of the plurality of CSI processes of the user equipment are configured for reporting a precoding matrix indicator (PMI) and a rank indicator (RI), and
wherein the data is processed without using the PRB bundling if at least one of the plurality of CSI processes of the user equipment is not configured for reporting the PMI and the RI.

7. The method of claim 6, wherein a number of consecutive PRBs included in one precoding resource group (PRG) is determined according to a system bandwidth if the PRB bundling is used.

8. The method of claim 6, wherein the information on the plurality of CSI processes is transmitted using a Radio Resource Control (RRC) signaling.

9. The method of claim 6, further comprising:
transmitting a demodulation reference signal (DM-RS).

10. The method of claim 9, wherein the DM-RS is used for the user equipment to measure a channel.

11. A user equipment in a wireless access system, the user equipment comprising:
a radio frequency (RF) unit; and
a processor that controls the RF unit to:
receive information on a plurality of channel state information (CSI) processes for reporting channel state information (CSI) from a base station; and
receive data from the base station,
wherein the data is processed by using a Physical Resource Block (PRB) bundling only if all of the plurality of CSI processes are configured for reporting a precoding matrix indicator (PMI) and a rank indicator (RI),
wherein the data is processed without using the PRB bundling if at least one of the plurality of CSI processes is not configured for reporting the PMI and the RI.

12. A base station in a wireless access system, the base station comprising:
a radio frequency (RF) unit; and
a processor that controls the RF unit to:
transmit, to a user equipment, information on a plurality of channel state information (CSI) processes for reporting CSI; and
transmit, to the user equipment, data based on whether or not a Physical Resource Block (PRB) bundling is used,
wherein the data is processed by using the PRB bundling only if all of the plurality of CSI processes of the user equipment are configured for reporting a precoding matrix indicator (PMI) and a rank indicator (RI), and
wherein the data is processed without using the PRB bundling if at least one of the plurality of CSI processes of the user equipment is not configured for reporting the PMI and the RI.

* * * * *